US006404794B1

(12) United States Patent
Sekiguchi et al.

(10) Patent No.: US 6,404,794 B1
(45) Date of Patent: Jun. 11, 2002

(54) EXCIMER LASER APPARATUS

(75) Inventors: Shinichi Sekiguchi, Yokohama; Masaru Osawa, Fujisawa; Satoshi Mori, Yokosuka; Tadashi Sato, Yokohama; Toshiharu Nakazawa, Chigasaki, all of (JP)

(73) Assignee: Ebara Corporation, Tokyo (JP)

( * ) Notice: Subject to any disclaimer, the term of this patent is extended or adjusted under 35 U.S.C. 154(b) by 64 days.

(21) Appl. No.: 09/676,779

(22) Filed: Oct. 2, 2000

(30) Foreign Application Priority Data

Oct. 4, 1999 (JP) ........................................ 11-283208

(51) Int. Cl.[7] ............................................ H01S 3/22

(52) U.S. Cl. ............................ 372/57; 372/37; 372/58; 372/98; 372/65

(58) Field of Search ............................ 372/37, 57, 58, 372/98, 61, 65; 415/229

(56) References Cited

U.S. PATENT DOCUMENTS 5,403,154 A * 4/1995 Ide ............................ 415/229
5,770,933 A * 6/1998 Larson et al. ................ 372/58
5,848,089 A * 12/1998 Sarkar et al. ................ 372/58
6,026,103 A * 2/2000 Oliver et al. ................ 372/37
6,104,735 A * 8/2000 Webb ......................... 372/37
2001/0017877 A1 * 8/2001 Sekiguchi et al. ............ 372/58

FOREIGN PATENT DOCUMENTS

JP 11283208 * 4/2001 ................. 372/58

* cited by examiner

*Primary Examiner*—Leon Scott, Jr.
(74) *Attorney, Agent, or Firm*—Armstrong, Westerman & Hattori, LLP

(57) ABSTRACT

An excimer laser apparatus comprises a container sealing a laser gas including a halogen gas therein, a pair of discharge electrodes disposed in the container for inducing an electric discharge capable of oscillating a laser light, and a circulating fan with a shaft for producing a high-speed laser gas stream between a pair of the discharge electrodes. Both ends of the shaft are rotatably supported by rotor-stator mechanisms, or one end of the shaft is rotatably supported by a rotor-stator mechanism, and the other end of the shaft is supported by a magnetic bearing. The rotor-stator mechanism comprises a rotor attached to the shaft of the circulating fan, a stator provided at a position opposed to the rotor, an electric motor winding provided in the stator for applying torque to the rotor, and a position control winding provided in the stator for producing a magnetic force to levitate and support the rotor.

3 Claims, 5 Drawing Sheets

1
2
3
4
5
5
11
11a
11b
11c
11d
12
12a
12b
12c
12d
12f
13
13a
13b
14
14
15
15
16
17
18
19
20
21
22
23
24
25
26
26
27
27

11b
11d
4
N
S
N
S
ϕ
PRODUCTION
OF TORQUE
U4
V4
W4
14
U2
V2
W2
15
PRODUCTION OF
RADIAL FORCE 1
2
3
4
5
5
11
11a
11b
11c
11d
13
13a
13b
14
15
16
17
18
20
21
22
23
24
25
26
26
27
27
31
32

41
42
43
44
45
45
51
51a
51b
51c
51d
52
52a
52b
52c
52d
53
53a
53b
53c
53d
53e
54
54a
54b
55
56
57
58
59

EXCIMER LASER APPARATUS

BACKGROUND OF THE INVENTION

1. Field of the Invention:

The present invention relates to an excimer laser apparatus having a circulating fan for producing a high-speed laser gas stream, and more particularly to an excimer laser apparatus having a feature in a motor for rotating a shaft of a circulating fan and a magnetic bearing for supporting the shaft of the circulating fan.

2. Description of the Related Art

FIG. 5 is a schematic view showing a structure of a conventional excimer laser apparatus. As shown in FIG. 5, the conventional excimer laser apparatus comprises a container 41 sealing a laser gas including a halogen gas such as a fluorine gas therein, ionization electrodes (not shown) disposed in the container 41 for ionizing the laser gas, and discharge electrodes 42, 42 disposed in the container 41 for inducing an electric discharge capable of oscillating a laser light. A circulating fan 43 for producing a high-speed laser gas stream between a pair of the discharge electrodes 42 and 42 is disposed in the container 41.

The circulating fan 43 has a shaft 44 penetrating therethrough and protruding from both ends thereof. The shaft 44 is supported in a non-contact manner by radial magnetic bearings 51, 52 provided at both ends of the container 41, and by an axial magnetic bearing 53 provided at one end of the container 41. A motor 54 is provided at a shaft end side of the radial magnetic bearing 52.

Displacement sensor targets 51*c*, 51*c* and electromagnet targets 53*d*, 52*d* of the radial magnetic bearings 51, 52, and a displacement sensor target 53*d* and an electromagnet target 53e of the axial magnetic bearing 53 are secured to the shaft 44. Further, a rotor 54*b* of the motor 54 is secured the shaft 44. Displacement sensors 51*a*, 52*a*, 53*a* , electromagnets 51*b*, 52*b*, 53*b*, 53*c*, and a stator 54*a* of the motor 54 are disposed at positions opposed to the displacement sensor targets 51*c*, 52*c* , 53*d* , the electromagnet targets 51*d*, 52*d*, 53*e*, and the rotor 54*b*.

Thin cylindrical bulkheads 55, 56 are provided on inner peripheral surfaces of the displacement sensors 51*a*, 52*a* and the electromagnets 51*b*, 52*b* of the radial magnetic bearings 51, 52, and the stator 54*a* of the motor 54. The bulkheads 55, 56 are formed of a material having corrosion resistance to the halogen gas included in the laser gas, e.g., austenitic stainless steel such as SUS316L. The bulkheads 55, 56 prevent the displacement sensors 51*a*, 52*a*, the electromagnets 51*b*, 52*b*, and the stator 54*a* from contacting the laser gas.

Like the radial magnetic bearings 51, 52, a bulkhead 57 is provided on the inner peripheral surface of the displacement sensor 53*a* of the axial magnetic bearing 53 to prevent the displacement sensor 53*a* from contacting the laser gas. The electromagnets 53*b*, 53*c* comprise cores formed of a ferromagnetic material having corrosion resistance to the halogen gas included in the laser gas, e.g., permalloy, and have bulkheads 58 provided only on the coils thereof.

The displacement sensor targets 51*c*, 52*c* , 53*d* and the electromagnet targets 51*d*, 52*d*, 53*e* of the radial magnetic bearings 51, 52 and the axial magnetic bearing 53 secured to the shaft 44 are disposed in airtight spaces communicating with the container 41. Therefore, the displacement sensor targets 51*c*, 52*c* , 53*d* and the electromagnet targets 53*d*, 52*d*, 53*e* are formed of a ferromagnetic material having corrosion resistance to the halogen gas, e.g., permalloy. The rotor 54*b* of the motor 54 is composed of a composite of a silicon steel plate and an aluminum alloy, and a permanent magnet. Therefore, a thin cylindrical bulkhead 59 is provided on the outer peripheral surface of the rotor 54*b*. The bulkhead 59 forms a sealed structure to prevent the rotor 54*b* from contacting the laser gas.

As described above, the conventional excimer laser apparatus requires the displacement sensors 51*a*, 52*a*, 53*a* and the electromagnets 51*b*, 52*b*, 53*b*, 53*c* of the radial magnetic bearings 51, 52 and the axial magnetic bearing 53, which are sequentially arranged in the axial direction. Therefore, the axial length of the shaft 44 is long, and the critical speed of the shaft 44 is decreased. Particularly, high-power laser light with continuous oscillation has been demanded in recent excimer laser apparatus. In order to perform continuous oscillation, it is necessary to replace the laser gas between the discharge electrodes 42 and 42 in a shorter time. Thus, it is necessary that the speed of the laser gas stream produced by the circulating fan 43 should be increased. Accordingly, the circulating fan 43 needs to be rotated at a high speed. However, when the axial length of the shaft 44 increases, the critical rotational speed decreases, so that it is difficult to rotate the circulating fan 43 at a high speed.

If the power of the motor 54 is increased to rotate the circulating fan 43 at a high speed, the motor 54 increases in rotational driving force and also increases in magnetic attraction force in the radial direction. This radial magnetic attraction force causes vibrations to the shaft 44. In order to cancel out the vibrations, the electromagnets 51*b*, 52*b* of the radial magnetic bearings 51, 52 need to be increased in magnetic force. Consequently, it is necessary to simultaneously achieve the increase in the power of the motor 54, and the enhancement of the magnetic force of the electromagnets 51*b*, 52*b* of the radial magnetic bearings 51, 52. This causes both of the radial magnetic bearings 51, 52 and the motor 54, and their installation spaces to be larger.

SUMMARY OF THE INVENTION

The present invention has been made in view of the above drawbacks. It is therefore an object of the present invention to provide an excimer laser apparatus which can solve the above drawbacks with a conventional excimer laser apparatus, and can facilitate high-speed rotation of a circulating fan, and requires reduced installation spaces for a bearing portion and a motor portion.

According to an aspect of the present invention, there is provided an excimer laser apparatus having a container sealing a laser gas including a halogen gas therein, a pair of discharge electrodes disposed in the container for inducing an electric discharge capable of oscillating a laser light, and a circulating fan with a shaft for producing a high-speed laser gas stream between a pair of the discharge electrodes, the excimer laser apparatus characterized in that: both ends of the shaft are rotatably supported by rotor-stator mechanisms, or one end of the shaft is rotatably supported by a rotor-stator mechanism, and the other end of the shaft is supported by a magnetic bearing; and the rotor-stator mechanism comprises a rotor formed of a magnetic material and attached to the shaft of the circulating fan, a stator provided at a position opposed to the rotor, an electric motor winding provided in the stator for applying torque to the rotor, and a position control winding provided in the stator for producing a magnetic force to levitate and support the rotor.

As described above, the rotor-stator mechanism comprises the rotor formed of a magnetic material and attached to the shaft of the circulating fan, the stator provided at a position opposed to the rotor, the electric motor winding provided in the stator for applying torque to the rotor, and the position control winding provided in the stator for producing a magnetic force to levitate and support the rotor. The end of the shaft is rotatably supported by the rotor-stator mechanism. This arrangement can eliminate the need to provide cores for electromagnets of the magnetic bearing and the motor. Therefore, the shaft length of the shaft can be shortened, and the installation spaces for the magnetic bearing and the motor can be reduced. Accordingly, since the critical speed of the shaft can be increased, the circulating fan can be easily rotated at a high speed. Further, the excimer laser apparatus can be downsized.

Further, a magnetic attraction force in the radial direction produced by the electric motor winding of the rotor-stator mechanism can be controlled so as to be cancelled out by a magnetic force produced by the position control winding, for thereby eliminating vibrations to be caused to the shaft.

In a preferred aspect of the present invention, a bulkhead is provided on an inner peripheral surface of the stator in the rotor-stator mechanism to locate the stator outside of the container for preventing the stator from contacting the laser gas.

As described above, the bulkhead is provided on the inner peripheral surface of the stator in the rotor-stator mechanism. Thus, the bulkhead can prevent the stator core, the electric motor winding, the position control winding, and the like constituting the stator with low corrosion resistance from contacting the laser gas including the halogen gas. Therefore, these members can be protected from corrosion. Furthermore, since the stator is not corroded by the laser gas, the laser gas is not contaminated with particles generated by corrosion. Thus, stable operation for a long term can be achieved.

In a preferred aspect of the present invention, a bulkhead is provided on an outer peripheral surface of the rotor in the rotor-stator mechanism to prevent the rotor from contacting the laser gas.

As described above, the bulkhead is provided on the outer peripheral surface of the rotor in the rotor-stator mechanism. Thus, the bulkhead can prevent the rotor from contacting the laser gas. Therefore, the rotor can be formed of a ferromagnetic material, a permanent magnet, or the like, regardless of corrosion resistance to the laser gas. Accordingly, a rotating machine with high efficiency can be obtained. Furthermore, since the rotor is not corroded by the laser gas, the laser gas is not contaminated with particles generated by corrosion. Thus, stable operation for a long term can be achieved.

The above and other objects, features, and advantages of the present invention will be apparent from the following description when taken in conjunction with the accompanying drawings which illustrates preferred embodiments of the present invention by way of example.

DETAILED DESCRIPTION OF THE PREFERRED EMBODIMENTS

Figure 1:
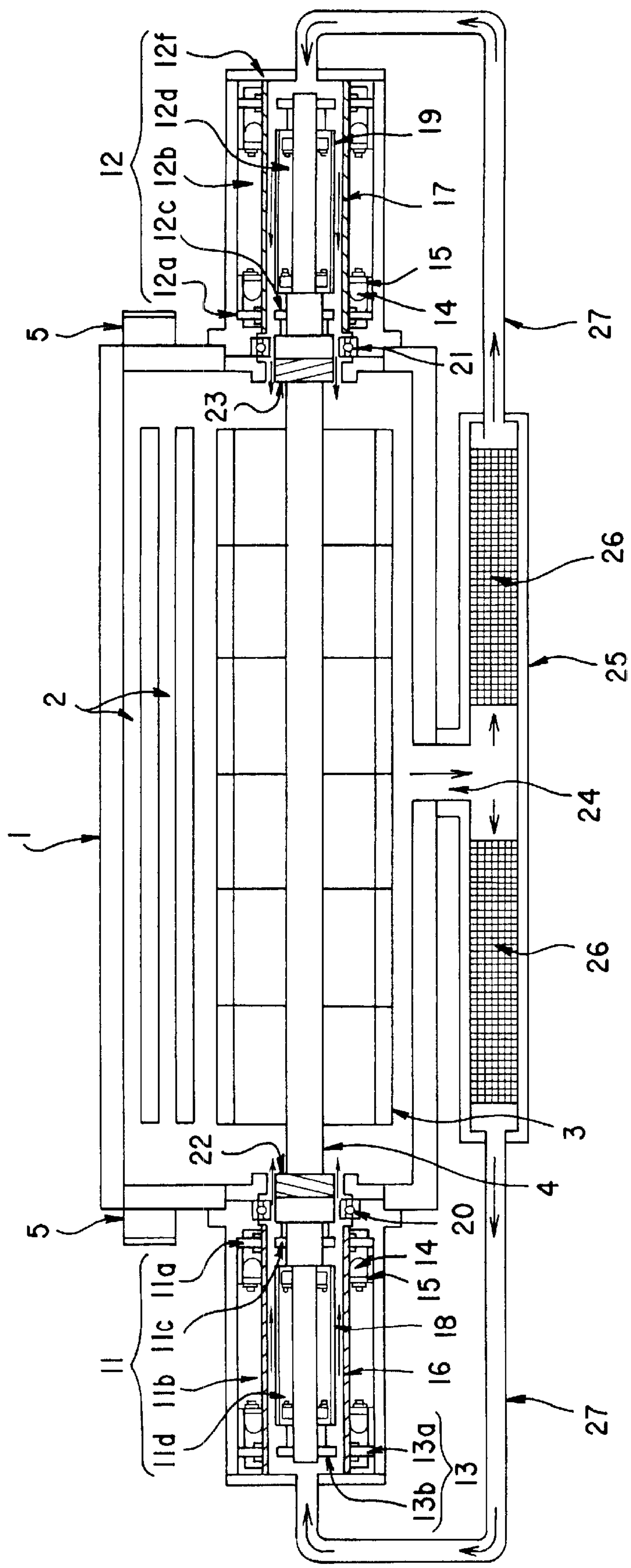
FIG. 1 is a vertical cross-sectional view showing a structure of an excimer laser apparatus according to an embodiment of the present invention.
Figure 2:
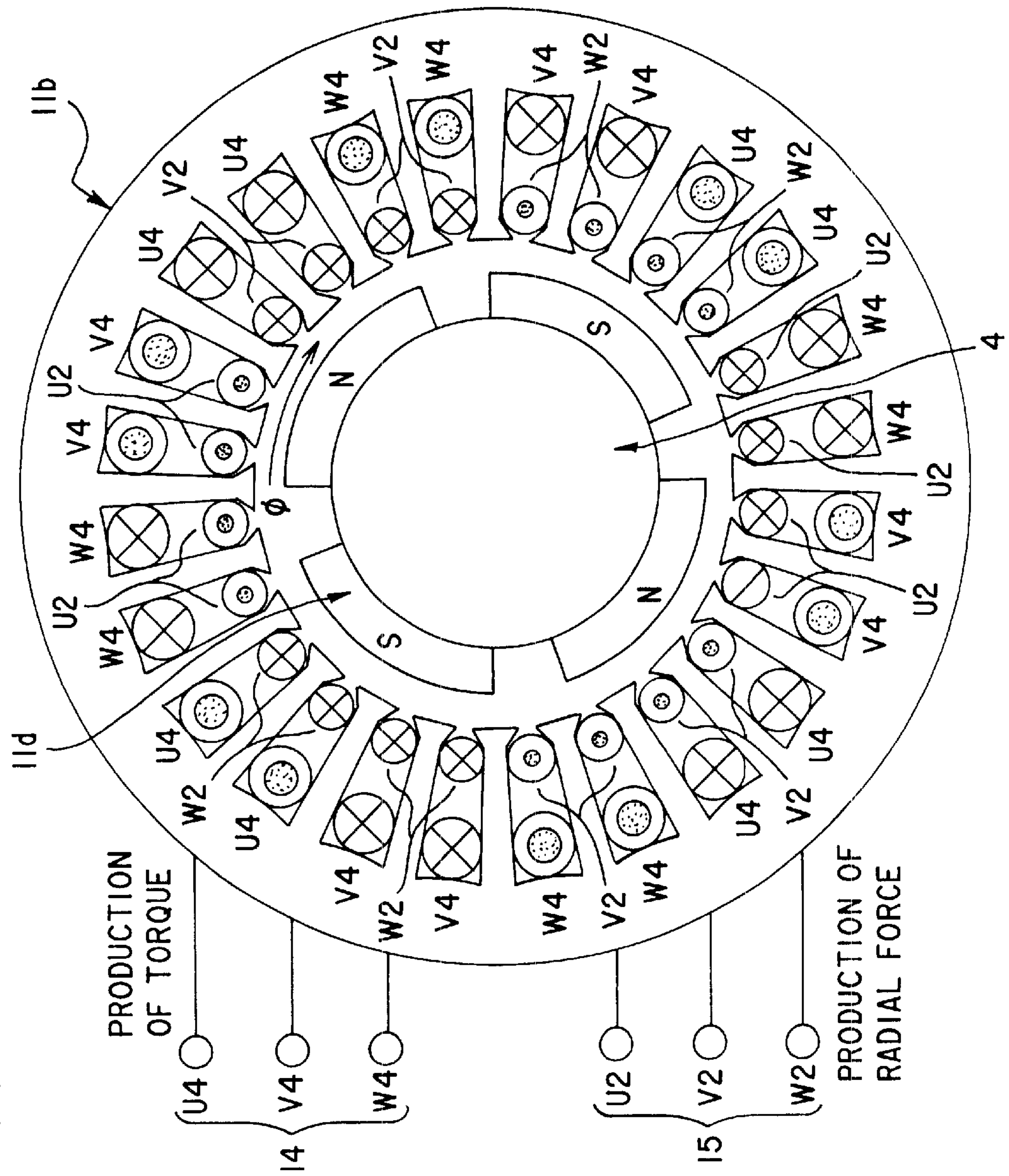
FIG. 2 is a horizontal cross-sectional view showing a rotor-stator mechanism of the excimer laser apparatus according to the embodiment of the present invention.

An excimer laser apparatus according to an embodiment of the present invention will be described below with reference to FIGS. 1 through 3. FIGS. 1 and 2 are schematic views showing a structure of an excimer laser apparatus according to an embodiment of the present invention. FIG. 1 is a vertical cross-sectional view of the excimer laser apparatus, and FIG. 2 is a horizontal cross-sectional view of a rotor-stator mechanism 11.

The excimer laser apparatus comprises a container 1 sealing a laser gas including a halogen gas such as a fluorine gas therein, ionization electrodes (not shown) disposed in the container 1 for ionizing the laser gas, and a pair of discharge electrodes 2, 2 disposed in the container 1 for inducing an electric discharge capable of oscillating a laser light. A circulating fan 3 for producing a high-speed laser gas stream between a pair of the discharge electrodes 2 and 2 is disposed in the container 1.

A laser excitation discharge is caused by applying a high voltage between a pair of the discharge electrodes 2 and 2, thus performing laser light oscillation. The produced laser light is emitted from the container 1 via windows 5, 5 provided in side walls of the container 1. The laser excitation discharge causes the laser gas between a pair of the discharge electrodes 2 and 2 to deteriorate. The deterioration of the laser gas causes the characteristics of the electric discharge to be worse, so that it is impossible to perform continuous oscillation. Therefore, the circulating fan 3 circulates the laser gas inside the container 1 to replace the laser gas between a pair of the discharge electrodes 2 and 2 per discharge, for thereby performing stably continuous oscillation.

The circulating fan 3 has a shaft 4 penetrating therethrough and protruding from both ends thereof. A displacement sensor target 11*c*, a rotor 11*d*, and a rotation sensor target 13*b* are secured to one of the protrusions of the shaft 4. Further, a displacement sensor target 12*c* and a rotor 12*d* are secured to the other protrusion of the shaft 4. Displacement sensors 11*a*, 12*a*, stators 11*b*, 12*b*, and a rotation sensor 13*a* are disposed at positions opposed to the displacement sensor targets 11*c*, 12*c*, the rotors 11*d*, 12*d*, and the rotation sensor target 13*b*.

Twenty-four slots are provided in the stator 11*b*. Three-phase quadrupole windings U4, V4, W4 and three-phase dipole windings U2, V2, W2 are provided in the slots. A three-phase alternating current is supplied into the three-phase quadrupole windings U4, V4, W4 to form a quadrupole rotating magnetic field. The rotor 11*d* is rotated in synchronism with the quadrupole rotating magnetic field to provide a rotational driving force of a motor to the shaft 4. Further, a magnetic levitating force for levitating the rotor 11*d* from the stator 11*b* with non-contact support is provided to the rotor 11*d* by the quadrupole rotating magnetic field.

A three-phase alternating current is supplied into the three-phase dipole windings U2, V2, W2 to form a dipole rotational controlling magnetic field. The dipole rotational controlling magnetic field and the quadrupole rotational driving magnetic field interfere with each other to form magnetic flux along the circumferential direction and to provide a force in the radial direction for controlling a magnetic levitation position and a levitated posture. Thus, the levitation position of the shaft can arbitrarily be controlled by adjusting the magnitude and phase of the dipole rotational controlling magnetic field, as in the case of a magnetic bearing.

The rotation sensor 13*a* and the displacement sensor 11*a* are provided for controlling the driving magnetic field and the controlling magnetic field produced by the rotor 11*d* and the stator 11*b*. The rotation sensor 13*a* measures a rotational speed and a rotation angle of the shaft 4. The displacement sensor 11*a* measures a radial displacement of the shaft 4. Three-phase alternating currents controlled in a controller (not shown) based on the measurements are supplied into electric motor windings 14 and position control windings 15 to support the shaft 4 rotatably and provide a rotational driving force to the shaft 4.

The principle that a rotational driving force and a magnetic levitating force can be produced simultaneously by the aforementioned structure will be described below with reference to a direct current machine equivalent model shown in FIG. 3. In the direct current machine equivalent model shown in FIG. 3, four-pole field windings Nd are provided in a protuberant stator, and four-pole armature windings Nq are provided in a rotor. The armature windings Nq are energized via brushes. Even when the rotor is rotated, the armature windings Nq do not move relative to the stator. An electric current is supplied to the field windings Nd to produce field magnetic flux ψd. The field magnetic flux ψd and the electric current of the field windings Nd produce torque, thus rotating the rotor.

Two-pole orthogonal windings Nx, Ny are provided in the armature in order to produce a radial force. The orthogonal windings Nx, Ny are energized via brushes. Even when the rotor is rotated, the orthogonal windings Nx, Ny do not move relative to the stator. When a positive electric current flows through the orthogonal windings Nx, Ny, magnetomotive forces in the x and y directions are produced, in the x-y rectangular coordinates fixed to the stator. Accordingly, when a positive electric current flows through the orthogonal windings Nx, two-pole magnetic flux ψx is produced as shown in FIG. 3. The magnetic flux ψx decreases in magnetic flux density toward a magnetic pole 1 and increases in magnetic flux density toward a magnetic pole 3. As a result, a radial force acting in the negative direction of the x-axis is produced in the rotor.

On the other hand, when a negative electric current flows through the orthogonal windings Nx, magnetic flux ψx in the opposite direction is produced. The magnetic flux ψx increases in magnetic flux density toward the magnetic pole 1 and decreases in magnetic flux density toward the magnetic pole 3. As a result, a force acting in the positive direction of the x-axis is produced in the rotor. Similarly, a radial force in the y-axis direction can be produced by an electric current flowing through the orthogonal windings Ny. For example, when a positive electric current flows through the orthogonal windings Ny, a radial force in the negative direction of the y-axis is produced in the rotor.

As described above, a radial force in both of the positive and negative directions of the x-axis and y-axis can be produced. The magnitude of the radial forces in the x-axis and y-axis directions can be adjusted by adjusting the magnitude of currents flowing through the orthogonal windings Nx, Ny. A radial force acting in a desired direction and having a desired magnitude can be produced by regulating the direction and magnitude of electric currents flowing through the orthogonal windings Nx, Ny.

Figure 3:
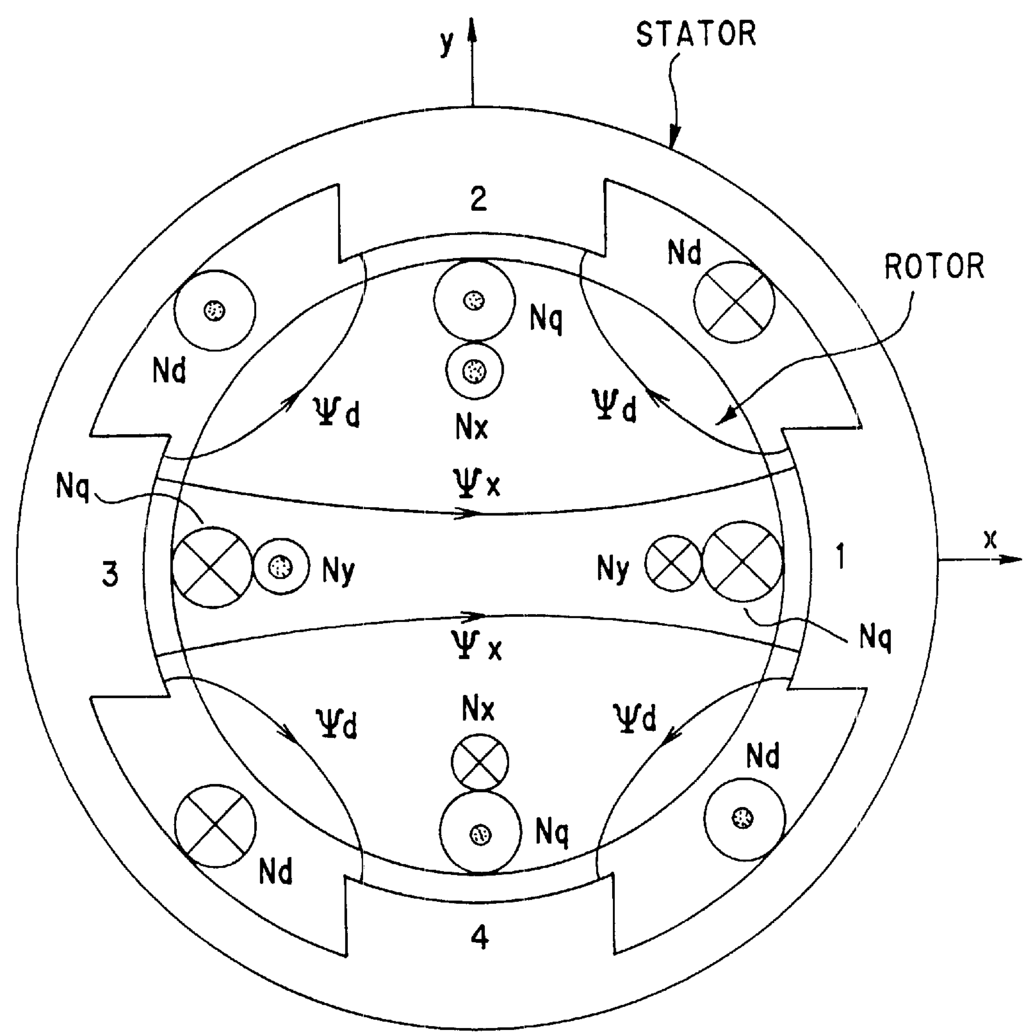
FIG. 3 is a schematic view showing a direct current machine equivalent model.

FIG. 2 shows an example of a permanent-magnet synchronous motor corresponding to the direct current machine equivalent model shown in FIG. 3. In the stator 11*b*, twenty-four slots are provided, and four-pole electric motor windings 14 (U4, V4, W4) and two-pole position control windings 15 (U2, V2, W2) are provided in the slots. The windings U4, V4, W4 correspond to the field windings Nd and the armature windings Nq. The windings U2, V2, W2 correspond to the orthogonal windings Nx, Ny. The rotor 11*d* has a four-pole salient pole structure, and is polarized in the illustrated magnetism by permanent magnets. The rotor-stator mechanism 12 has the same structure as the rotor-stator mechanism 11, and will not thus be described below.

As shown in FIG. 1, thin cylindrical bulkheads 16, 17 are provided on inner peripheral surfaces of the displacement sensors 11*a*, 12*a*, the stators 11*b*, 12*b*, and the rotation sensor 13*a*. The bulkheads 16, 17 are formed of a material having corrosion resistance to the halogen gas included in the laser gas, e.g., austenitic stainless steel such as SUS316L. The bulkheads 16, 17 prevent the displacement sensors 11*a*, 12*a*, the stators 11*b*, 12*b*, and the rotation sensor 13*a* from contacting the laser gas.

The rotors 11*d*, 12*d* are composed of a composite of a silicon steel plate and an aluminum alloy, and a permanent magnet. Therefore, thin cylindrical bulkheads 18, 19 are provided on the outer peripheral surfaces of the rotors 11*d*, 12*d*. The bulkheads 18, 19 are formed of a material having corrosion resistance to the halogen gas included in the laser gas, i.e., austenitic stainless steel, such as SUS316L. The bulkheads 18, 19 form a sealed structure to prevent the rotors 11*d*, 12*d* from contacting the laser gas.

If no electric current is supplied to the position control windings 15 provided in the stators 11*b*, 12*b*, then protective bearings 20, 21 disposed near the displacement sensors 11*a*, 12*a* support the shaft 4 of the circulating fan 3. With this arrangement, the span between the bearings in the case of the support of the shaft 4 by the protective bearings 20, 21 is nearly equal to the span between bearings in the case of the support of the shaft 4 by a magnetic attraction force produced by supplying electric current to the position control windings 15. Therefore, the critical speeds are nearly equal in both cases. Accordingly, even if the need to rotate the shaft 4 on the protective bearings 20, 21 arises at a sudden stop of electric current supplied to the position control windings 15, stable rotation with minimal vibrations can be achieved.

In the vicinity of positions on the shaft 4 which are opposed to the both ends of the container 1, there are provided thread groove labyrinths 22, 23 for preventing dust generated by consumption of the discharge electrodes 2, 2 from entering into airtight spaces communicating with the container 1. Thus, the labyrinths 22, 23 can prevent the dust from entering into the airtight spaces (spaces inside housings of the rotor-stator mechanisms 11, 12) communicating with the container 1 and from impeding the rotation of the shaft. Further, the labyrinths 22, 23 can also prevent the dust from adhering to the bearing surfaces of the protective bearings 20, 21 and impeding the rotation of the shaft 4 on the protective bearings 20, 21.

A gas outlet 24 is provided nearly at the center of the container 1. The dust included in the laser gas flowing out through the gas outlet 24 is removed by a dust filter 26 in a gas introduction chamber 25. Then, the laser gas is introduced into end portions of the shaft 4 through gas introduction pipes 27, 27. Thus, circulation of the laser gas as shown by arrows in FIG. 1 reliably prevents the dust from entering into the airtight spaces communicating with the container 1.

As described above, the rotor-stator mechanisms 11, 12 are disposed at both ends of the shaft 4 to rotatably support the shaft 4. With this arrangement, the length of the shaft 4 can be shortened compared with the conventional excimer laser apparatus having cores provided in electromagnets of a magnetic bearing and a motor. Thus, the shaft can be rotated at a high speed, so that a high-speed laser gas stream can be produced between a pair of the discharge electrodes, and continuous oscillation of the laser can be performed at a high speed. Furthermore, incorporation of the electromagnets of the magnetic bearing and the stator of the motor can reduce the installation space, and hence miniaturization of the excimer laser apparatus and reduction of cost can be achieved.

Figure 4:
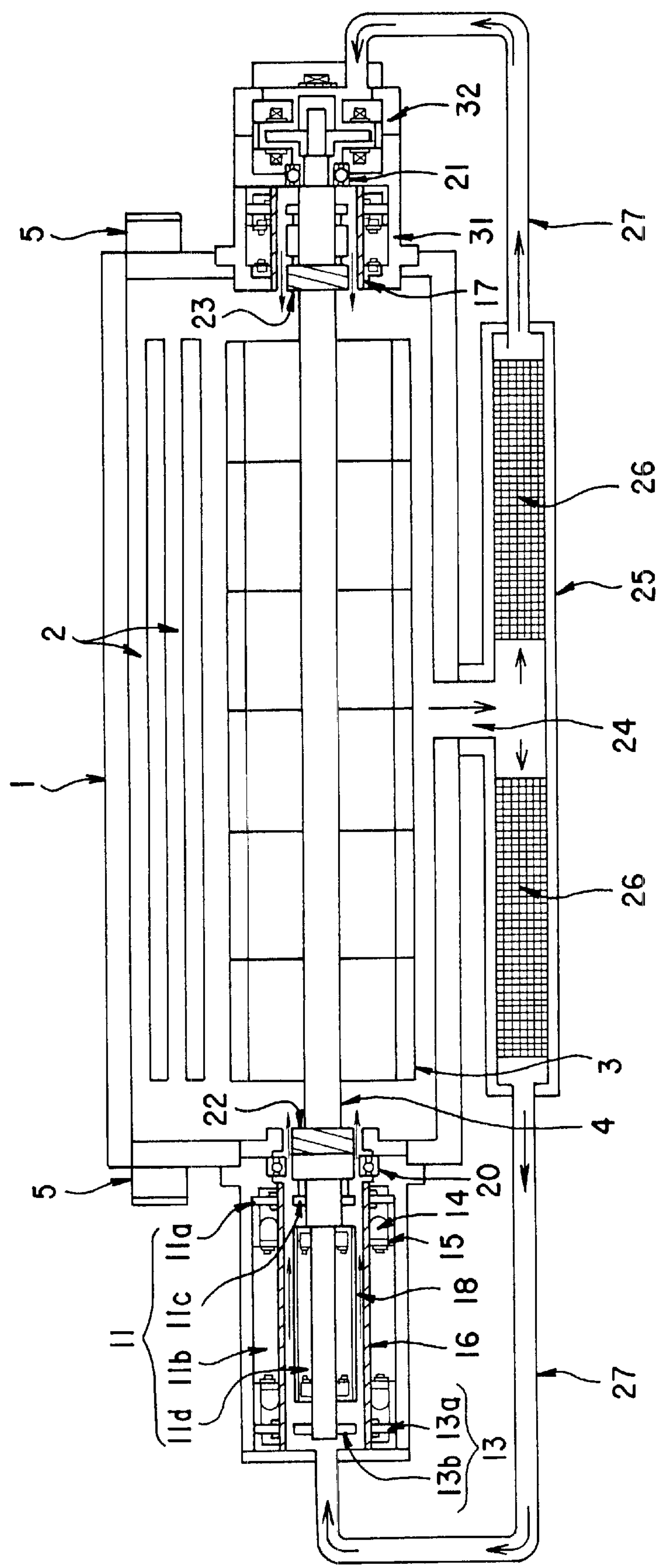
FIG. 4 is a vertical cross-sectional view showing a structure of an excimer laser apparatus according to another embodiment of the present invention.
Figure 5:
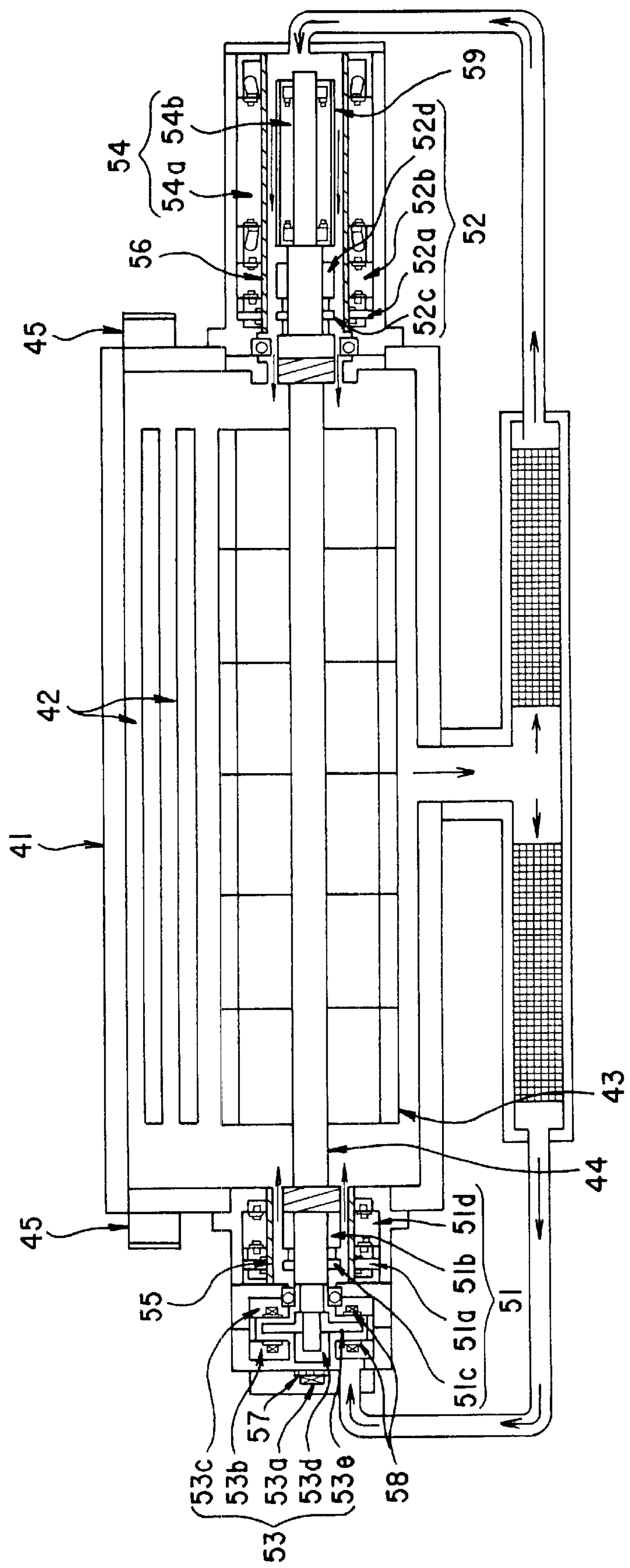
FIG. 5 is a vertical cross-sectional view showing a structure of a conventional excimer laser apparatus.

In this embodiment, the rotor-stator mechanisms 11, 12 are disposed at both of the protruding end portions of the shaft 4 of the circulating fan 3. However, the present invention is not limited to this embodiment. For example, as shown in FIG. 4, a rotor-stator mechanism 11 may be provided in one end portion of a shaft 4, and a radial magnetic bearing 31 and an axial magnetic bearing 32 may be provided in the other end portion of the shaft 4. According to this arrangement, the shaft 4 of a circulating fan 3 may be rotatably supported by the rotor-stator mechanism 11, the radial magnetic bearing 31, and the axial magnetic bearing 32. In this case, a rotational driving force may be produced by the rotor-stator mechanism 11.

Although certain preferred embodiments of the present invention have been shown and described in detail, it should be understood that various changes and modifications may be made therein without departing from the scope of the appended claims.

What is claimed is:

1. An excimer laser apparatus having a container sealing a laser gas including a halogen gas therein, a pair of discharge electrodes disposed in said container for inducing an electric discharge capable of oscillating a laser light, and a circulating fan with a shaft for producing a high-speed laser gas stream between a pair of said discharge electrodes, said excimer laser apparatus characterized in that:

both ends of said shaft are rotatably supported by rotor-stator mechanisms, or one end of said shaft is rotatably supported by a rotor-stator mechanism, and the other end of said shaft is supported by a magnetic bearing; and said rotor-stator mechanism comprises a rotor formed of a magnetic material and attached to said shaft of said circulating fan, a stator provided at a position opposed to said rotor, an electric motor winding provided in said stator for applying torque to said rotor, and a position control winding provided in said stator for producing a magnetic force to levitate and support said rotor.

2. The excimer laser apparatus according to claim 1, wherein a bulkhead is provided on an inner peripheral surface of said stator in said rotor-stator mechanism to locate said stator outside of said container for preventing said stator from contacting said laser gas.

3. The excimer laser apparatus according to claim 1, wherein a bulkhead is provided on an outer peripheral surface of said rotor in said rotor-stator mechanism to prevent said rotor from contacting said laser gas.

* * * * *